United States Patent
Mosquera

(10) Patent No.: US 6,540,303 B2
(45) Date of Patent: Apr. 1, 2003

(54) VEHICLE SEAT COVER, AND A VEHICLE SEAT INCLUDING SUCH A COVER

(75) Inventor: Pablo Mosquera, Echarcon (FR)

(73) Assignee: Faurecia Sieges d'Automobile SA, Boulogne (FR)

(*) Notice: Subject to any disclaimer, the term of this patent is extended or adjusted under 35 U.S.C. 154(b) by 0 days.

(21) Appl. No.: 10/046,865

(22) Filed: Jan. 15, 2002

(65) Prior Publication Data

US 2002/0101110 A1 Aug. 1, 2002

(30) Foreign Application Priority Data

Jan. 31, 2001 (FR) .............................. 01 01305

(51) Int. Cl.[7] ................................................ A47C 7/72
(52) U.S. Cl. ..................... 297/452.58; 297/180.12; 219/217; 5/421
(58) Field of Search .................. 297/180.12, 180.1, 297/452.58; 219/217, 528, 529, 549, 636, 212; 112/197; 5/421

(56) References Cited

U.S. PATENT DOCUMENTS

| 2,712,592 A | * | 7/1955 | Goldstein et al. |
| 2,782,289 A | * | 2/1957 | Nathanson |
| 3,017,493 A | * | 1/1962 | Cooke |
| 4,869,550 A | * | 9/1989 | Lorenzen et al. |
| 4,952,776 A | | 8/1990 | Huguet ........................ 219/217 |
| 4,964,674 A | * | 10/1990 | Altmann et al. |
| 5,002,335 A | * | 3/1991 | Bengtsson |

FOREIGN PATENT DOCUMENTS

| DE | 3513909 | * | 10/1986 |
| DE | 42 33 118 | | 1/1994 |
| EP | 0 347 969 | | 12/1989 |
| EP | 0 351 275 | | 1/1990 |
| JP | 3145089 | | 6/1991 |
| WO | WO 91/16841 | | 11/1991 |
| WO | WO 94/09684 | * | 5/1994 |

OTHER PUBLICATIONS

French Preliminary Search Report dated Oct. 15, 2001, Appl. No. FR0101305.

* cited by examiner

Primary Examiner—Laurie K. Cranmer
(74) Attorney, Agent, or Firm—McCracken & Frank

(57) ABSTRACT

A flexible cover for a vehicle seat, the cover having an inside face against which a conductive thread is fixed by means of a flexible assembly thread forming a seam of chain stitches, which seam does not pass through the cover and is not visible on its outside face, the assembly thread penetrating into the thickness of the cover and surrounding the conductive thread.

9 Claims, 2 Drawing Sheets

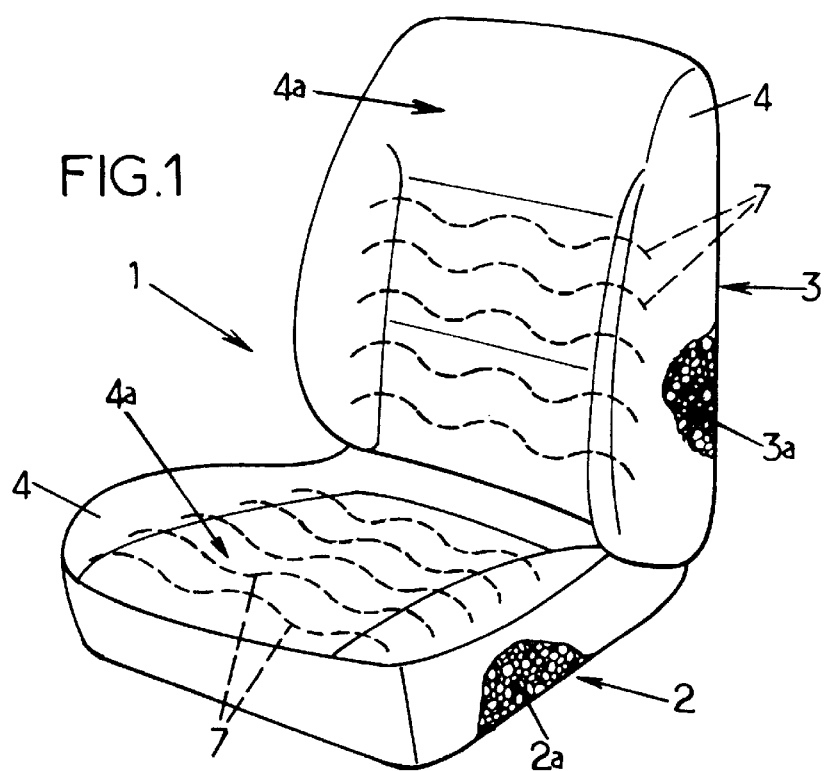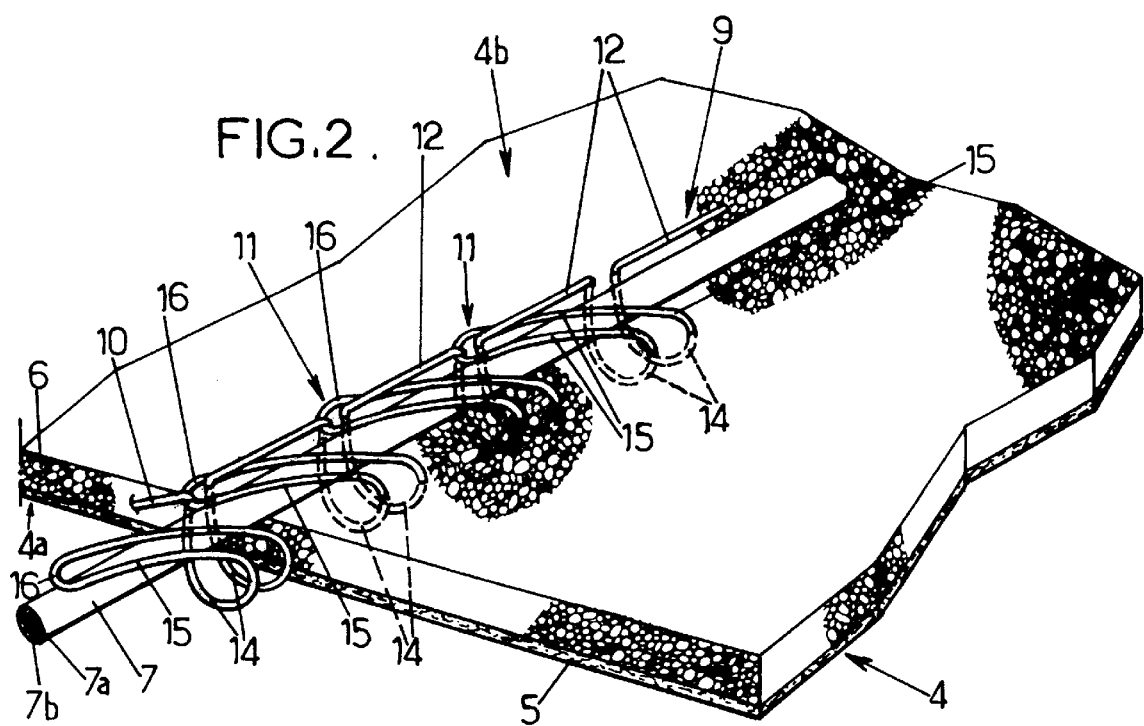

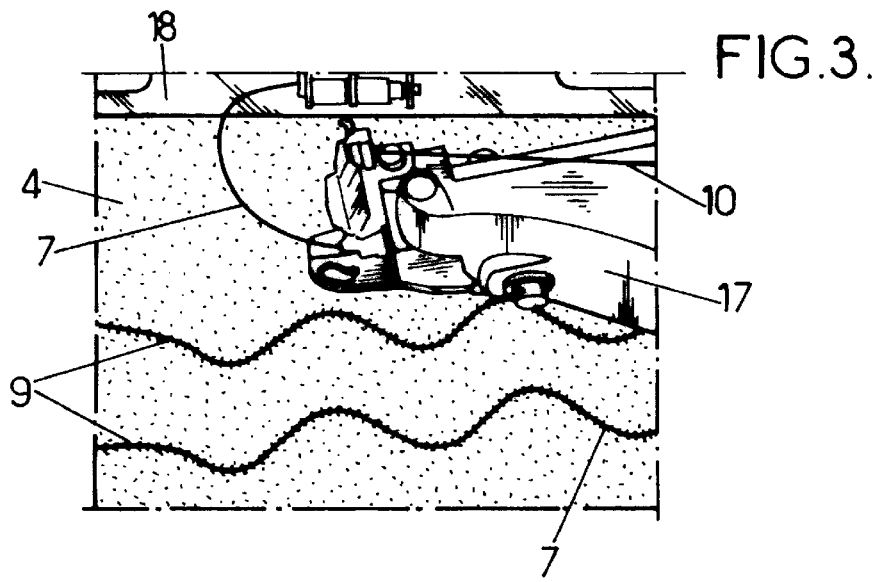
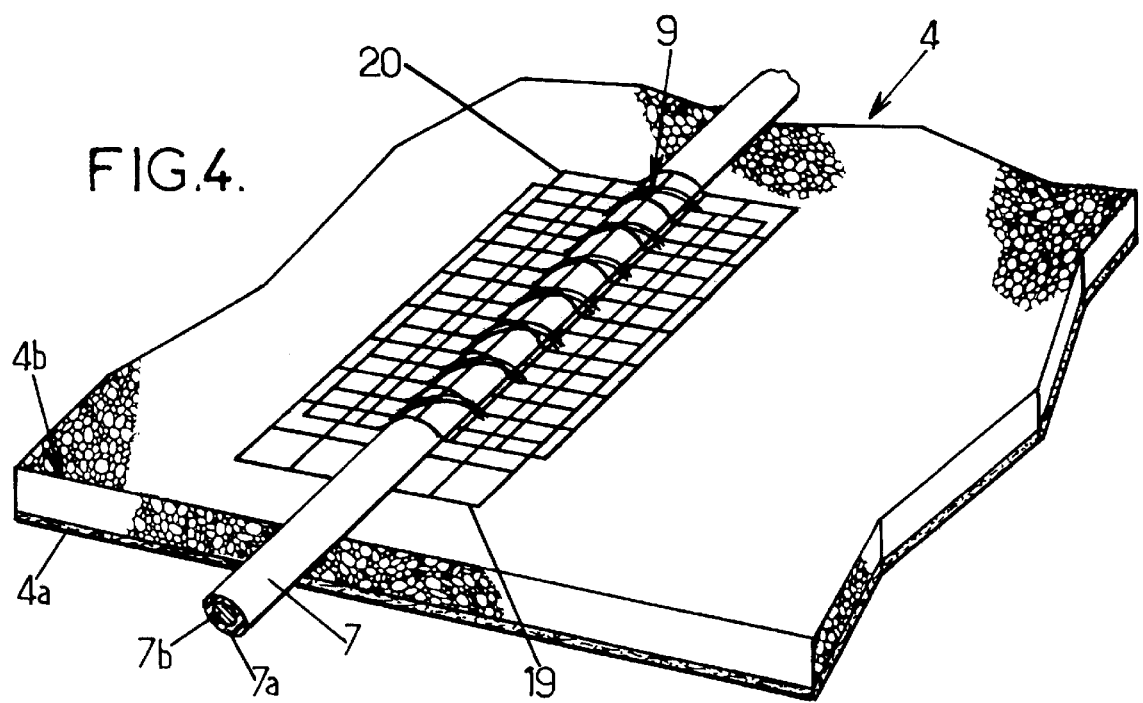

VEHICLE SEAT COVER, AND A VEHICLE SEAT INCLUDING SUCH A COVER

The present invention relates to vehicle seat covers, and to vehicle seats including such covers.

More particularly, the invention relates to a flexible cover for covering flexible padding belonging to a vehicle seat, said cover having an inside face for facing the padding and an outside face designed to be visible to a user of the seat, said cover presenting a certain thickness between its inside and outside faces, and having at least one conductive thread fixed to its inside face.

BACKGROUND OF THE INVENTION

Document EP-A-0 347 969 describes an example of such a seat cover in which the conductive thread (specifically an electric heater wire) is heat-sealed under the cover. That type of conductive thread fixing presents the advantage of being invisible from the outside of the seat. However the process whereby the conductive thread is assembled under the cover is complex and requires tooling that is expensive.

OBJECTS AND SUMMARY OF THE INVENTION

A particular object of the present invention is to mitigate that drawback without losing the advantage of the invisible way in which the conductive thread is fixed under the cover.

To this end, according to the invention, in a cover of the kind in question, the conductive thread is fixed to the cover by at least one flexible assembly thread forming a non-through seam that is not visible on the outside face of the cover, the assembly thread penetrating into the thickness of the cover and passing around the conductive thread, thereby holding said conductive thread against the inside face of the cover.

By means of these dispositions, the conductive thread can be assembled against the inside face of the cover merely by using conventional tooling for sewing, which tooling is easy to use and inexpensive.

It should be observed that the conductive thread mentioned above is generally and preferably constituted by an electrically-conductive metal wire, but that where appropriate it could be constituted by a light-conducting optical fiber.

In preferred embodiments of the invention, it is possible to use one or more of the following dispositions:

- the seam comprises a single assembly thread sewn using a chain stitch;
- the conductive thread is an electrically-conductive metal wire;
- the conductive thread has an insulating outer sheath;
- the assembly thread is electrically conductive and forms a shield around the conductive thread;
- the conductive thread is interposed between two electrically conductive walls which are assembled together with the conductive thread against the inside face of the cover by said assembly thread;
- said two electrically conductive walls are conductive grids; and
- the conductive thread is of a diameter lying in the range 0.5 millimeters (mm) to 5 mm.

The invention also provides a vehicle seat comprising flexible padding covered by a cover as defined above, with the inside face of the cover being placed against the flexible padding.

BRIEF DESCRIPTION OF THE DRAWINGS

Other characteristics and advantages of the invention appear from the following description of two embodiments, given as non-limiting examples and described with reference to the accompanying drawings.

In the drawings:

FIG. 1 is a diagrammatic perspective view of a vehicle seat fitted with a cover of the invention;

FIG. 2 is a cutaway view of a cover suitable for fitting to the FIG. 1 seat and constituting a first embodiment of the invention, the cover being shown with its inside face looking upwards;

FIG. 3 shows the process whereby the conductive threads are assembled under the FIG. 2 cover; and FIG. 4 is a perspective showing a portion of a seat cover suitable for fitting to the FIG. 1 seat in a second embodiment of the invention, this cover being shown with its inside face looking upwards.

MORE DETAILED DESCRIPTION

In the various figures, the same references designate elements that are identical or similar.

FIG. 1 shows a motor vehicle seat 1 having a seat proper 2 and a back 3. The seat proper 2 and the back 3 have flexible padding respectively referenced 2a and 3a, generally made of synthetic foam, which padding is supported by a rigid internal frame (not shown) and is covered on the outside by a cover 4.

Beneath the cover 4 of the seat proper 2 and/or the back 3, there are fixed conductive threads 7, specifically electrically-conductive threads which can follow wavy paths, as shown in FIG. 1, or any other kind of path suitable for the purpose of such electric threads.

The conductive threads 7 in question can be intended, for example, to constitute:

- a resistive electrical heater device for improving seat comfort in winter;
- one or more wires for powering electrical appliances integrated in the seat 1; and/or
- sensors, in particular capacitive sensors for detecting the presence of a user sitting on the seat 1 and/or for determining the posture of the user, e.g. to ensure that an airbag is inflated to a greater or lesser extent, as appropriate.

The conductive threads 7 are not restricted to the examples given above, and it is even possible, where appropriate, for the conductive threads to be constituted by optical fibers which conduct light, and which can be used for applications other than those mentioned above (e.g. for measuring forces).

As shown in FIG. 2, each conductive thread 7 can comprise, for example, an insulating outer sheath 7a and an inner metal core 7b for conducting electricity. Each of these conductive threads, which can have an outside diameter lying in the range 0.5 mm to 5 mm, for example, is fixed against the inside face 4b of the cover by a seam 9 that does not pass through the cover and that is not visible on its outside face 4a, the seam comprising at least one assembly thread 10 which penetrates into the thickness of the cover 6 and which surrounds the conductive thread 7 by pressing it against the inside face of the cover.

When the cover 4 comprises a textile layer 5 on its outside face 4a and a layer of foam 6 or of other flexible material on its inside face 4b, the assembly thread 10 can, for example, penetrate solely into the layer of foam 6, passing over the thread 7 so as to fix said conductive thread under the cover.

Preferably, as shown in FIG. 2, each seam 9 comprises a single thread 10 sewn using a chain stitch, said stitch carrying international numerical code 103 and/or 105 (ISO standard 4915).

In this chain stitch, the thread 10 forms successive loops 11 which surround the conductive thread 7, penetrating into the foam 6 of the cover, and whose ends 16 are adjacent to each other on one side of the thread 7 on the inside face 4b of the cover. The pitch of the chain stitch, i.e. the distance between two successive ends 16, can lie in the range 1 mm to 5 mm, for example.

These successive loops are connected to one another by rectilinear segments 12 that are parallel to the conductive thread 7, each of these rectilinear segments 12 extending between the ends 16 of two adjacent loops 11.

Each of said loops 11 comprises:

two parallel curved segments 14 which respectively extend the two rectilinear segments 12 terminating at the end 16 of the preceding loop 11, these curved segments 14 penetrating into the foam 6 of the cover and passing under the conductive thread 7; and then two parallel segments 15 respectively extending the curved segments 14 and reappearing from the foam 6 in the inside face 4b of the cover on the other side of the conductive thread 7 away from the ends 16 of the loops 11, these two segments 15 overlying the conductive thread 7 and meeting to form the end 16 of the loop 11 in question.

As shown diagrammatically in FIG. 3, the conductive threads 7 are assembled to the inside face of the cover 4 by means of the seams 9 which can be made by using tooling that comprises the following, for example:

a sewing machine 17 provided with a curved needle head of conventional design and adapted to perform chain stitch, the head of the sewing machine being fed with assembly thread 10 and with conductive thread 7; and advantageously a horizontally moving flatbed 18 which supports the cover 4 under the head of the sewing machine 17, this flatbed 18 being movable horizontally in two perpendicular directions so as to make it easier to follow optional complex paths for the conductive thread 7, e.g. wavy paths of the kind shown in FIG. 3.

Advantageously, when it is necessary to shield the conductive thread 7, the assembly thread 10 can itself be an electrically-conductive thread, in particular a metal wire such as that sold under the reference 275x2HQ by Sprintmetal (Usinor group, France), for example. The assembly thread 10 then constitutes shielding for the conductive thread 7.

Additionally or as a variant of the above disposition, and as shown in FIG. 4, it is also possible for the conductive thread 7 to be placed between two flexible conductive grids 19, 20 (in particular grids made of metal) which are sewn by the seam 9 together with the thread 7 against the inside face 4b of the cover.

What is claimed is:

1. A flexible cover for covering flexible padding belonging to a vehicle seat, said cover having an inside face for facing the padding and an outside face designed to be visible to a user of the seat, said cover presenting a certain thickness between the inside and outside faces, and having at least one conductive thread fixed to the inside face, wherein the conductive thread is fixed to the cover by at least one flexible assembly thread forming a non-through seam that is not visible on the outside face of the cover, the assembly thread penetrating into the thickness of the cover and passing around the conductive thread, thereby holding said conductive thread against the inside face of the cover.

2. A cover according to claim 1, in which the seam comprises a single assembly thread sewn using a chain stitch.

3. A cover according to claim 2, in which the conductive thread is an electrically-conductive metal wire.

4. A cover according to claim 3, in which the conductive thread has an insulating outer sheath.

5. A cover according to claim 3, in which the assembly thread is electrically conductive and forms a shield around the conductive thread.

6. A cover according to claim 3, in which the conductive thread is interposed between two electrically conductive walls which are assembled together with the conductive thread against the inside face of the cover by said assembly thread.

7. A cover according to claim 6, in which said two electrically conductive walls are conductive grids.

8. A cover according to claim 1, in which the conductive thread is of a diameter lying in the range 0.5 mm to 5 mm.

9. A vehicle seat comprising flexible padding covered by a cover according to claim 1, the inside face of the cover being placed against the flexible padding.

* * * * *